Dec. 23, 1941.  H. W. LARSON  2,266,874
TOOL
Filed Sept. 7, 1939
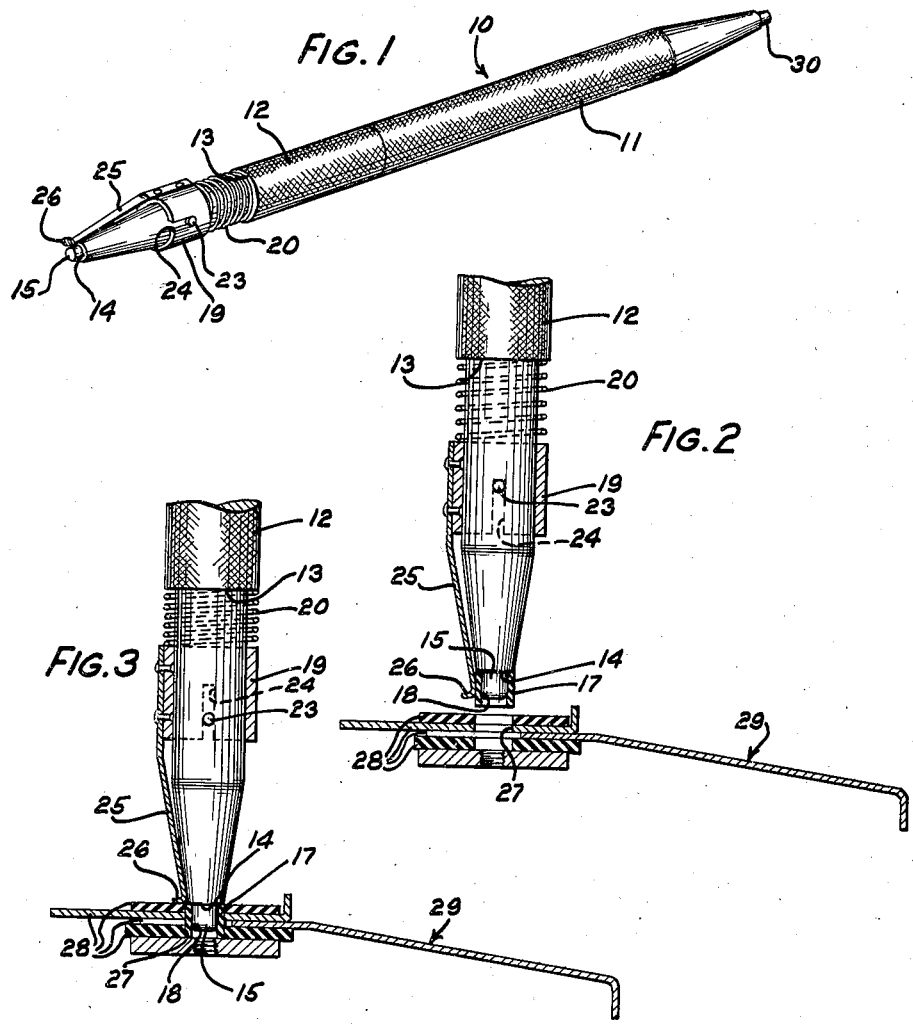
INVENTOR
H. W. LARSON
BY Emery Robinson
ATTORNEY Patented Dec. 23, 1941

2,266,874

UNITED STATES PATENT OFFICE 2,266,874

TOOL

Homer W. Larson, Downers Grove, Ill., assignor to Western Electric Company, Incorporated, New York, N. Y., a corporation of New York Application September 7, 1939, Serial No. 293,693

1 Claim. (Cl. 81—3)

This invention relates to tools and more particularly to tools for handling apertured parts during their mounting in apertured members.

The object of this invention is the provision of an efficient and practical hand tool for readily gripping an apertured part, placing it in a receiving aperture of a member and automatically releasing the same upon withdrawing the tool therefrom.

In attaining this object there is provided, in one embodiment of the invention a hand tool for use in connection with handling and inserting small circular rubber bushings in aligned apertures of members of a commutator brush used in panel dial telephone apparatus, comprising a hand grip member having a shouldered end portion terminating in a suitable diameter for insertion in the apertured bushing. Surrounding the end portion is a spring pressed sleeve carrying a resilient finger arranged to automatically engage the periphery of the bushing as the end of the tool is entered in the aperture thereof to hold the bushing to the tool. During the insertion of the bushing in the apertures of the members the sleeve and finger move upon the hand grip member and the finger finally springs over the end face of the bushing and upon withdrawing the tool from the bushing the bushing is stripped from the tool.

Other objects and features of this invention will more fully appear from the following detailed description, taken in connection with the accompanying drawing, in which Fig. 1 is a perspective view of the hand tool for handling apertured parts embodying the features of this invention;

Fig. 2 is a fragmentary enlarged view, partly in section, of the tool shown in Fig. 1 with an apertured part gripped thereto and in position for insertion in aligned apertures of members of a commutator brush, shown fragmentarily, and Fig. 3 is a view similar to Fig. 2 showing the position of the part gripping finger on the tool and its relation to the apertured part after being inserted in the apertures of the members.

Referring now to the drawing, 10 is a pencil-like hand grip of circular cross-section throughout which may comprise two sections 11 and 12 joined together in any well known manner and made of aluminum and steel, respectively, or of other desirable materials, the part 11 being preferably of aluminum to reduce the weight of the tool. The peripheral surface of the parts 11 and 12 are knurled as indicated to facilitate the handling of the tool. At its lower end, as viewed in Figs. 2 and 3, the diameter of the part 12 is reduced in diameter beginning with a shoulder 13 and is further reduced in diameter from a shoulder 14 to its extreme outer end surface, the length of the latter reduced end which is indicated at 15 being less than the length of an apertured part 17, in the present use a small rubber bushing, to be handled by the tool. The diameter of the tool end 15 is such that it may freely enter the aperture, indicated at 18, in the part 17. Yieldably slidably carried on the reduced portion of the tool part 12 is a sleeve 19, which is normally urged downwardly toward the reduced tool end 15 by a compression spring 20 surrounding the tool part 12 between the shoulder 13 and the adjacent end of the sleeve 19. The sleeve 19 is prevented from turning on the tool part 12 and its downward movement is limited by a pin 23 fixed to and extending laterally through the tool part with its opposite ends projecting into slots 24 formed in the sleeve at diametrically opposite points, only one of the slots 24 being shown in the drawing. Fixed to and depending from the sleeve 19 is a yieldable finger 25 of spring steel. The finger 25 normally bears against the peripheral edge of the tool part 12 at the shoulder 14, the tool part being tapered from the shoulder 14 to a point slightly below the lower end of the sleeve 19 to permit the extreme lower inner end surface of the finger to normally lie close to the peripheral surface of the extreme lower end portion 15 of the tool part. At its lower end the finger 25 is provided with an outwardly curved arm or foot 26 which normally lies substantially in the plane of the lower end surface of the tool end portion 15.

The above described embodiment of tool is designed primarily for handling and inserting small circular rubber bushings 17 in aligned apertures 27 of members 28 of a commutator brush fragmentarily shown and indicated in general at 29 which is used in panel dial telephone apparatus. It will be understood that the members 28 during the assembly of the bushing 17 in the aligned apertures are held in a suitable jig (not shown). Also after the bushing 17 has been assembled with the members 28 a clamp plate is placed over the bushing and thereafter a screw is inserted through an aperture in the plate and the aperture of the bushing and threaded into a screw threaded aperture in the bottom member 28 to secure the parts in assembled relation. A detailed description of the commutator brush 29 is not believed necessary to a full understanding of this invention, since it forms no part thereof.

In the use of the tool the operator grasps the hand grip 10 and while holding it in a vertical position lowers it and enters the end portion 15 in the aperture 18 of one of a supply of bushings 17 which may be arranged on a table or other support with their apertures vertically disposed. As the tool end 15 enters the apertured bushing the outwardly curved foot 26 of the yieldable spring finger 25 engaging the upper peripheral edge of the bushing deflects the spring finger outwardly and it rides onto and along the periphery of the bushing until the upper end surface of the bushing abuts the shoulder 14 on the tool. At this stage in the handling of the bushing 17 which is shown in Fig. 2 the bushing is gripped to the tool end 15 by the spring action of the finger 25. The operator now aligns the bushing 17 gripped to the tool with the aligned apertures 27 of the members 28 of the commutator brush 29, as shown in Fig. 2, and moves the tool downwardly and as the bushing enters the apertures 27, the foot 26 of the spring finger 25 is moved into engagement with the upper surface of the upper brush member 28 and in the continued movement of the bushing into the apertures the finger which is attached to the yieldable slidable sleeve 19 moves upwardly while bearing against the periphery of the bushing and compresses the spring 20. When the bushing has been fully inserted in the apertures 27 the finger 25 has moved slightly inwardly to position it against the periphery of the tapered portion of the tool and thus is slightly within the outer periphery of the bushing. The position of the finger 25 relative to the tool end 15 and the bushing 17 upon the bushing being fully inserted in the apertures 27 of the brush members 28 is shown in Fig. 3. Thereafter, in moving the tool from engagement with the inserted bushing 17, the tool end 15 is withdrawn in a vertical direction from the aperture 18 of the bushing and the foot 26 of the spring finger 25 remains in engagement with the upper brush member 28 due to the action of the spring 20. Before the end surface of the tool end moves into the plane of the upper end surface of the bushing the finger has moved inwardly sufficiently to position the lower inner surface thereof over the upper end surface of the bushing which insures that the bushing will be stripped from the tool end 15 and remain behind in the apertures 27 when the tool is fully withdrawn from engagement with the commutator brush 29. At its end opposite the end 15 the tool part 11 is reduced in diameter, as indicated at 30 (Fig. 1) to provide a portion of suitable length and diameter which may be readily inserted in the aperture of the bushing 17 to remove it from the receiving apertures 27 of the brush members 28 if for any reason it is found desirable to do so.

Although the tool in the present embodiment of the invention is designed for handling a particular type of apertured part, namely a rubber bushing of circular cross-section formed with a circular aperture, it will be obvious that the tool could be constructed and applied equally well to the handling of square, hexagonal or other shapes of apertures articles and the apertures thereof may be of different contours.

From the foregoing description, it will be apparent that an efficient and practical tool is provided whereby apertured parts may readily be picked up, moved and inserted in receiving apertures of members and thereafter upon withdrawing the tool from the part it will be automatically stripped from the tool.

Various modifications and applications of the invention will suggest themselves to those skilled in the art, and such modifications and applications as fall within the spirit of the invention are intended to be covered by the scope of the appended claim.

What is claimed is:

A tool for gripping, supporting and assembling an apertured part in a receiving aperture of a member comprising a hand grip having an integral end portion of reduced diameter adapted to be entered in an aperture of the part, said end portion terminating in a shoulder a predetermined distance from its end face effective as an abutment for the part, and resilient means yieldably and slidably carried on said hand grip and normally closely associated with said end portion and adapted to be deflected outwardly thereof automatically upon said end portion being inserted in the aperture of the part whereupon the resilient means bears against the outer surface of the part to resiliently grip the same to the end portion and thereafter to move over the end of the part and automatically strip the same from the end portion upon withdrawing the end portion from the part.

HOMER W. LARSON.